United States Patent
Koga

(10) Patent No.: US 9,207,737 B2
(45) Date of Patent: Dec. 8, 2015

(54) INFORMATION PROCESSING APPARATUS, CONTROL METHOD THEREOF, AND STORAGE MEDIUM

(71) Applicant: CANON KABUSHIKI KAISHA, Tokyo (JP)

(72) Inventor: Kazuhiro Koga, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 322 days.

(21) Appl. No.: 13/939,878

(22) Filed: Jul. 11, 2013

(65) Prior Publication Data
US 2014/0047249 A1    Feb. 13, 2014

(30) Foreign Application Priority Data

Aug. 8, 2012   (JP) .................. 2012-176371

(51) Int. Cl.
G06F 1/32   (2006.01)
(52) U.S. Cl.
CPC ............... *G06F 1/32* (2013.01); *G06F 1/3206* (2013.01); *G06F 1/3287* (2013.01); *Y02B 60/1282* (2013.01)
(58) Field of Classification Search
CPC ....... G06F 1/32; G06F 1/3206; G06F 1/3287; Y02B 60/1282
See application file for complete search history.

(56) References Cited

U.S. PATENT DOCUMENTS

| 9,043,619 B2* | 5/2015 | Lee et al. ...................... 713/300 |
| 2009/0157960 A1 | 6/2009 | Koga |
| 2012/0042187 A1* | 2/2012 | Morimura et al. ............ 713/323 |
| 2013/0232362 A1* | 9/2013 | Zhou ............................. 713/323 |

FOREIGN PATENT DOCUMENTS

| JP | 6-85867 A | 3/1994 |
| JP | 6-334699 A | 12/1994 |

* cited by examiner

*Primary Examiner* — Thuan Du
(74) *Attorney, Agent, or Firm* — Fitzpatrick, Cella, Harper & Scinto

(57) ABSTRACT

An information processing apparatus (MFP) according to this invention cyclically inquires, of a server, whether to activate the power source during the stop of the second power source functioning as the main power source of the MFP. The NIC of the MFP that operates by using the first power source as a power source establishes a link for an inquiry to the server, and calculates an electric energy consumed for the inquiry based on the link rate of the established link and the time taken for the inquiry. Further, the NIC adjusts the cycle of the inquiry so that the average power consumption of the MFP in the state in which the second power source is stopped, that is determined by the calculated consumed electric energy, does not exceed a threshold corresponding to a target power.

13 Claims, 9 Drawing Sheets

INFORMATION PROCESSING APPARATUS, CONTROL METHOD THEREOF, AND STORAGE MEDIUM

BACKGROUND OF THE INVENTION

1. Field of the Invention

The present invention relates to an information processing apparatus which performs power source control by remote management by a server apparatus communicable via a network, a control method thereof, and a storage medium.

2. Description of the Related Art

Conventionally, to receive, from a server at a remote place, communication data which requests power-on, an information processing apparatus which adopts a control method of turning on a power source by remote control waits by keeping a communication control unit in a continuous power-on state while turning off the apparatus main body (see Japanese Patent Laid-Open No. 6-85867). This technique increases unnecessary power consumption because the communication control unit waits for reception in the continuous power-on state even in a time period such as midnight during which the power source is less likely to be turned on.

To avoid this, there is known a technique of setting in advance the power-on permission time in an information processing apparatus remote-controlled by a server, and enabling power-on by remote control in only the set time period (see Japanese Patent Laid-Open No. 6-334699). However, the power-on request time (power management setting) changes day to day such that the time period during which the server requests power-on is changed upon a change of settings on the server side, or the power-on setting becomes fine depending on the day of the week. For this reason, even if the information processing apparatus enables reception of a power-on request in synchronism with the reception timing of the power-on request from the server, the request from the server may not be received quickly. This may generate an error between the power-on timing managed in the server and the timing to actually turn on the power source of the whole apparatus in the information processing apparatus.

To solve this, there is an inquiry control method of turning on a power source for a communication control unit (network interface (I/F) device) by an information processing apparatus, and voluntarily inquiring the latest power-on timing set in a server, of the server by the communication control unit. Even if the power management setting has been changed on the server side, the information processing apparatus can perform power source control following the setting change.

When the information processing apparatus cyclically makes an inquiry to the server and turns on the power source in accordance with an instruction from the server, as in the above-described conventional technique, power source control of the information processing apparatus can be more accurately performed based on the power-on timing managed in the server as the inquiry cycle becomes shorter. However, as the inquiry cycle becomes shorter, the number of times of energization to the network I/F device which makes the inquiry increases, the power consumption of the network I/F device increases, and thus the power consumption while the power source of the information processing apparatus main body is OFF increases. As a result, it may become difficult to suppress the power consumption of the information processing apparatus to be equal to or smaller than a power (target power) set as a target value while the power source of the whole information processing apparatus is OFF.

If the inquiry cycle is prolonged, the number of times of energization to the network I/F device decreases, and the power consumption of the information processing apparatus can be suppressed to be equal to or smaller than the target value. However, a long inquiry cycle may increase an error of the timing to actually turn on the power source in the information processing apparatus, with respect to the power-on timing managed in the server.

Further, the power consumption of the network I/F device changes depending on a network environment where the information processing apparatus is connected (for example, depending on a communication rate supported by an opposing apparatus, such as a hub, connected to the information processing apparatus). To suppress the power consumption of the information processing apparatus to be equal to or smaller than a target value, the inquiry cycle needs to be controlled in accordance with the connection state of the information processing apparatus to the network.

SUMMARY OF THE INVENTION

The present invention has been made to solve the above-described problems. The present invention provides a technique of controlling the power consumption to be equal to or smaller than a target value in accordance with the network connection state while reducing an error between the power-on timing managed in a server apparatus and the timing to turn on the power source of the whole apparatus in an information processing apparatus.

According to one aspect of the present invention, there is provided an information processing apparatus comprising: a communication unit configured to communicate with a server apparatus at one network communication rate out of a plurality of network communication rates; a first power source configured to supply power to the communication unit; and a second power source configured to be activated by the communication unit in accordance with an instruction from the server apparatus, the communication unit including: an inquiry unit configured to, when a set timing comes in a state in which power supply by the second power source is stopped, communicate with the server apparatus at one network communication rate out of the plurality of network communication rates, and inquire, of the server apparatus, whether to activate the second power source; and a setting unit configured to set, based on the one network communication rate, a timing to communicate with the server apparatus next.

According to another aspect of the present invention, there is provided a method of controlling an information processing apparatus, the information processing apparatus including a communication unit configured to communicate with a server apparatus at one network communication rate out of a plurality of network communication rates, a first power source configured to supply power to the communication unit, and a second power source configured to be activated by the communication unit in accordance with an instruction from the server apparatus, the control method comprising: an inquiry step of, when a set timing comes in a state in which power supply by the second power source is stopped, communicating with the server apparatus at one network communication rate out of the plurality of network communication rates, and inquiring, of the server apparatus, whether to activate the second power source; and a setting step of setting, based on the one network communication rate, the timing to communicate with the server apparatus next.

According to still another aspect of the present invention, there is provided a computer-readable storage medium storing a computer program for causing a computer to execute steps of a method of controlling an information processing apparatus, the information processing apparatus including a communication unit configured to communicate with a server apparatus at one network communication rate out of a plurality of network communication rates, a first power source configured to supply power to the communication unit, and a second power source configured to be activated by the communication unit in accordance with an instruction from the server apparatus, the control method comprising: an inquiry step of, when a set timing comes in a state in which power supply by the second power source is stopped, communicating with the server apparatus at one network communication rate out of the plurality of network communication rates, and inquiring, of the server apparatus, whether to activate the second power source; and a setting step of setting, based on the one network communication rate, the timing to communicate with the server apparatus next.

The present invention can provide a technique of controlling the power consumption to be equal to or smaller than a target value in accordance with the network connection state while reducing an error between the power-on timing managed in a server apparatus and the timing to turn on the power source of the whole apparatus in an information processing apparatus.

Further features of the present invention will become apparent from the following description of exemplary embodiments (with reference to the attached drawings).

DESCRIPTION OF THE EMBODIMENTS

Hereinafter, embodiments of the present invention will be described in detail with reference to the accompanying drawings. It should be noted that the following embodiments are not intended to limit the scope of the appended claims, and that not all the combinations of features described in the embodiments are necessarily essential to the solving means of the present invention.

First Embodiment

<Arrangement of Communication System>

Figure 1:
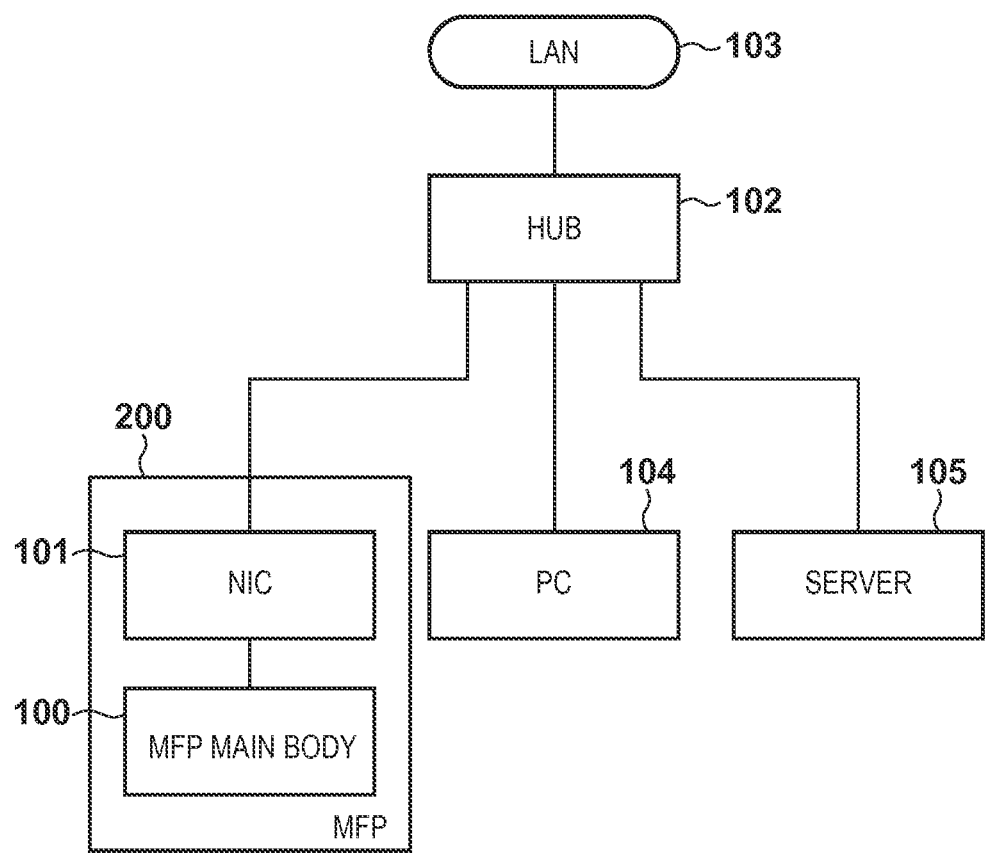
FIG. 1 is a block diagram showing the arrangement of a communication system according to the first and second embodiments.

The first embodiment will explain a case in which the present invention is applied to an MFP (Multi-Function Peripheral) having functions such as image formation (printing), reading, and transmission. FIG. 1 is a block diagram showing the arrangement of a communication system including the MFP according to the first embodiment. An MFP 200 shown in FIG. 1 functions as an example of an information processing apparatus according to the present invention.

The MFP 200 includes an MFP main body 100, and a network interface (I/F) device (to be referred to as a "NIC" hereinafter) 101. The MFP main body 100 is connected to a HUB 102 via the NIC 101. The HUB 102 is connected to a LAN (Local Area Network) 103. Note that an arbitrary apparatus having a communication function is connectable to the HUB 102. In the communication system shown in FIG. 1, for example, a PC 104 and server 105 are connected in addition to the NIC 101 of the MFP 200. The MFP 200 can communicate with external apparatuses such as the PC 104 and server 105 by using the NIC 101.

The HUB 102 is a line concentrator such as Ethernet®, and supports three communication rates (link rates) of 10 Mbps, 100 Mbps, and 1,000 Mbps in the embodiment. As for Duplex, the HUB 102 supports full-duplex communication and half-duplex communication at 10 Mbps and 100 Mbps, and supports full-duplex communication at 1,000 Mbps. Assume that a link rate and Duplex are designated in advance as a communication mode to be used for each port of the HUB 102. Note that it may be set to execute AutoNegotiation without permanently designating the link rate and Duplex for each port.

In the server 105 (server apparatus), application software is installed to manage power consumption by performing power source control of each of (one or more) information processing apparatuses communicable via the network, including the MFP 200. The server 105 operates the application software, and centralizes management of the timing to turn off the power source and the timing to turn it on for an information processing apparatus to be managed.

In the embodiment, the NIC 101 functions as an example of the communication unit. In the communication system exemplified in FIG. 1, the NIC 101 can communicate with the server 105 via the HUB 102 (opposing apparatus) connected to the MFP 200. The NIC 101 cyclically inquires, of the server 105, whether to activate the main power source of the MFP 200 in a state in which the main power source is stopped, which will be described later.

<Arrangement of MFP 200>

Figure 2:
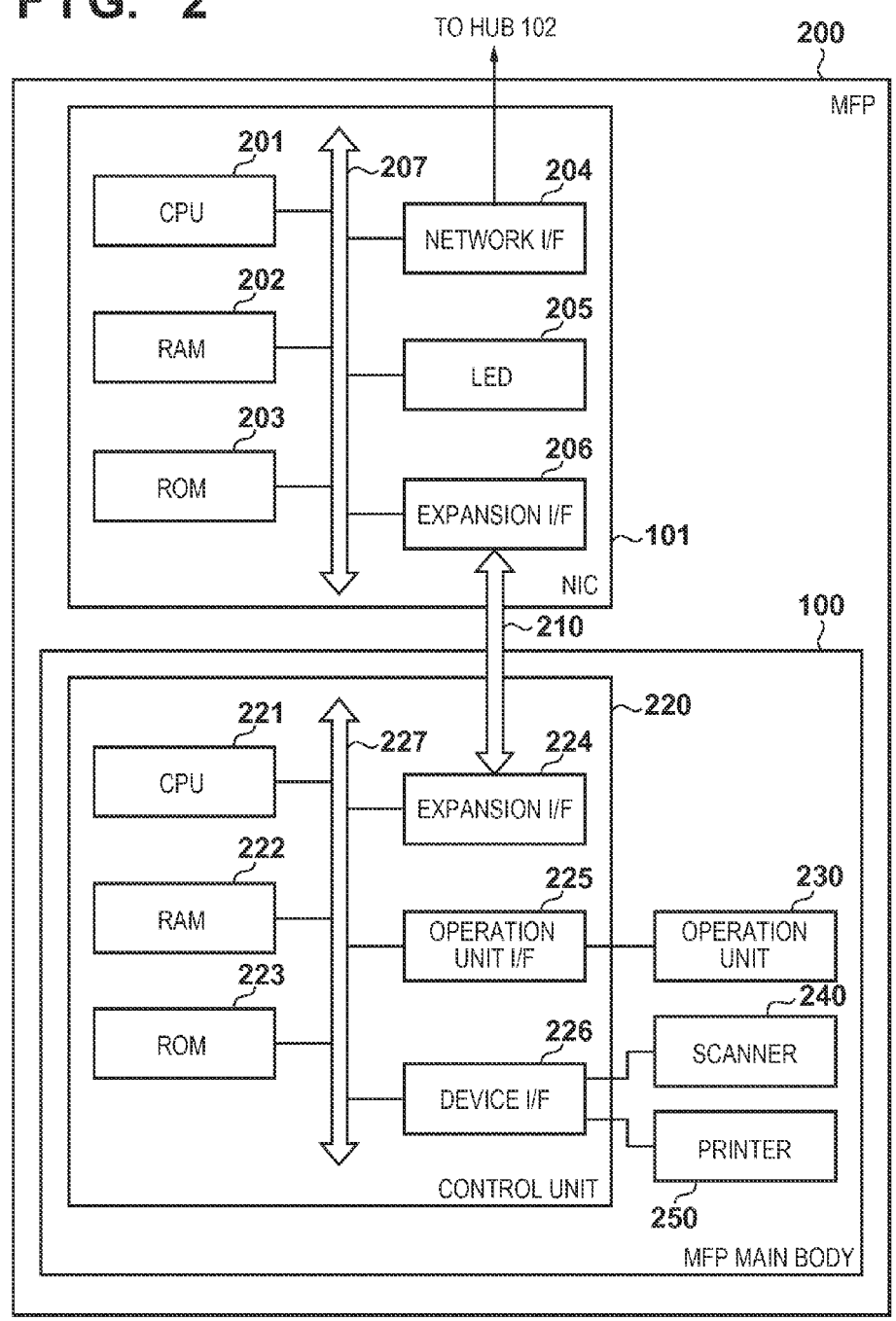
FIG. 2 is a block diagram showing the hardware arrangement of an MFP 200 according to the first and second embodiments.

The arrangement of the MFP 200 including the MFP main body 100 and NIC 101 will be explained with reference to FIG. 2.

(Hardware Arrangement of NIC 101)

The NIC 101 is a network I/F device which is implemented by an intelligent network card module and connected to the MFP main body 100. The NIC 101 includes a CPU 201, RAM 202, ROM 203, network I/F 204, LED 205, and expansion I/F 206 for the NIC 101, and a system bus 207 which connects these devices to each other.

The CPU 201 executes various control processes by reading out control programs stored in the ROM 203 to the RAM 202 and executing them. For example, the CPU 201 connects (establishes link) to the HUB 102 (opposing apparatus) via the network I/F 204 connected to the system bus 207. The CPU 201 communicates with a terminal on the LAN 103 via the HUB 102 in accordance with a predetermined communication protocol. The CPU 201, for example, receives various data such as print data and a printer control instruction transmitted from a print data generation apparatus on the LAN 103. Further, the CPU 201 can transfer the received data to the MFP main body 100 via the expansion I/F 206, and control the MFP main body 100 to execute print processing.

The RAM 202 is used as a main memory and a temporary storage area such as a work area for the CPU 201. The LED 205 is used as a display unit for presenting a display which represents the operation state of the NIC 101. The LED 205 can represent, by the color and flickering pattern of the LED, various operation states of the NIC 101 such as the electrical connection state between the network I/F 204 and the HUB 102, and the communication mode.

The expansion I/F 206 is an I/F for connecting the NIC 101 and MFP main body 100, and is connected to an expansion I/F 224 of the MFP main body 100 via a local cable 210. The expansion I/F 206 of the NIC 101 and the expansion I/F 224 of the MFP main body 100 include connectors (not shown), respectively, and these connectors are physically connected. The connector of the expansion I/F 206 makes the NIC 101 detachable from the MFP main body 100. The NIC 101 can be mounted on another MFP having the same arrangement as that of the expansion I/F 224 of the MFP main body 100.

Although the NIC 101 is detachable from the MFP main body 100 in the description of the embodiment, it may be directly mounted on the board of the MFP main body 100. The network I/F 204 has an ability to communicate at one of the link rates of 10 Mbps, 100 Mbps, and 1,000 Mbps by full-duplex or half-duplex when the MFP main body 100 stands by.

(Hardware Arrangement of MFP Main Body 100)

The MFP main body 100 includes a control unit 220, operation unit 230, scanner 240, and printer 250. The control unit 220 includes a CPU 221, RAM 222, ROM 223, expansion I/F 224, operation unit I/F 225, and device I/F 226 for the MFP main body 100, and a system bus 227 which connects these devices to each other.

The CPU 221 executes various control processes by reading out control programs stored in the ROM 223 to the RAM 222 and executing them. For example, the CPU 221 generates output image data based on print data transferred from the NIC 101 via the expansion I/F 224, and outputs it to the printer 250 via the device I/F 226. The RAM 222 functions as a main memory, work area, and the like for the CPU 221. The RAM 222 is configured to be able to expand the memory capacity by using an optional RAM which is connected to an expansion port (not shown).

The operation unit 230 includes buttons for performing operations such as setting of the operation mode of the MFP main body 100 and cancellation of execution of printing, and a display unit including an LED and a liquid crystal panel for displaying the operation state of the MFP main body 100. Setting of the communication mode and the like can also be performed via the operation unit 230. The printer 250 executes image formation (printing) based on image data by using an electrophotographic method (laser beam method), inkjet method, sublimation (thermal transfer) method, or the like. The scanner 240 reads an image on an original to generate image data, and inputs the image data to the MFP main body 100 via the device I/F 226.

(Software Arrangement of NIC 101)

Figure 3:
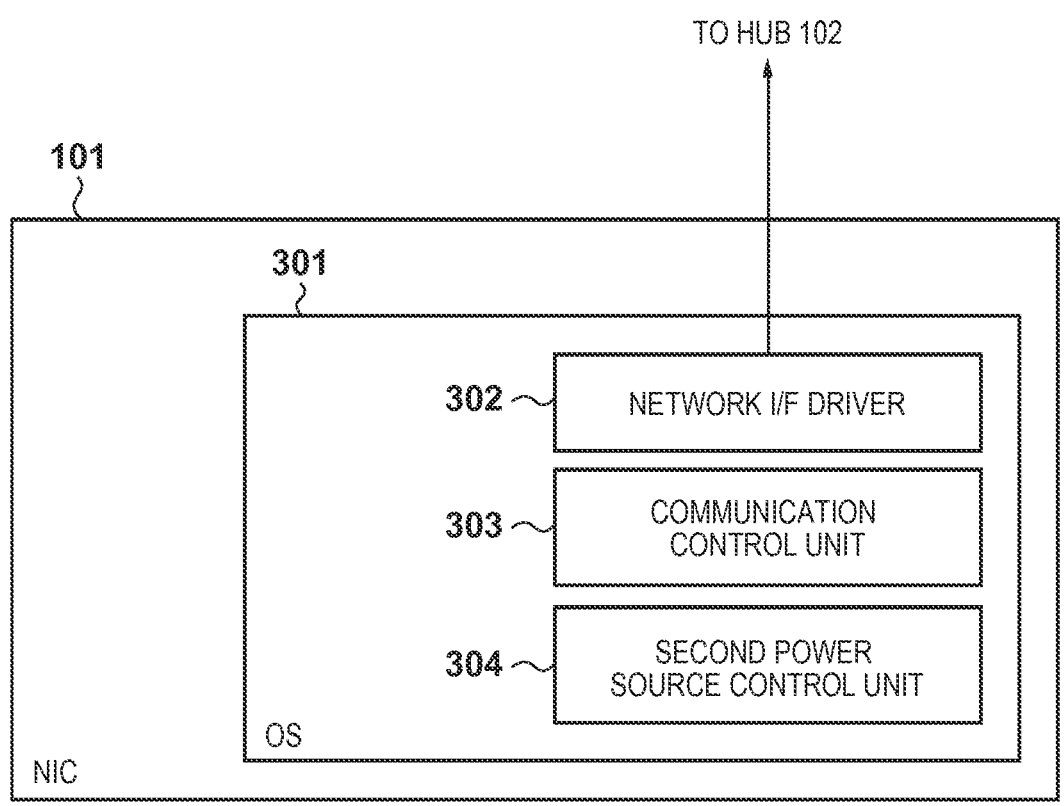
FIG. 3 is a block diagram showing the software arrangement of a NIC 101 in the MFP 200 according to the first and second embodiments.

The software arrangement of the NIC 101 will be explained with reference to FIG. 3. FIG. 3 shows only software programs which are highly relevant to the following description and are used for communication control and power source control by the NIC 101. However, the NIC 101 may include software programs other than those shown in FIG. 3.

Each software program shown in FIG. 3 is stored in the memory (ROM 203) of the NIC 101. In response to activation of the NIC 101, the CPU 201 reads out each software program to the RAM 202 and executes it. The NIC 101 includes, as software programs running on the NIC 101, an operating system (OS) 301, and a network I/F driver 302, communication control unit 303, and second power source control unit 304 which run on the OS 301.

The network I/F driver 302 controls execution of communication processing by the network I/F 204. The communication control unit 303 controls the network I/F driver 302 to set the communication mode in accordance with contents designated by the MFP main body 100, and the network I/F driver 302 to execute communication packet transmission/reception processing.

The second power source control unit 304 generates a packet for inquiring, of the server 105, whether to activate the MFP 200 (MFP main body 100). The second power source control unit 304 requests the communication control unit 303 to transmit the packet, thereby transmitting the packet to the server 105. The second power source control unit 304 controls to turn on a second power source 406 (FIG. 4) based on a response status and response content from the server 105 that are received by the communication control unit 303.

(Arrangement Associated with Power Source Control of MFP 200)

An arrangement associated with power source control of the MFP 200, and the flow of an instruction signal associated with the power source control will be explained with reference to FIG. 4. The MFP 200 includes three power sources, that is, an auxiliary power source 401, a first power source 404, and the second power source 406. That is, the MFP 200 includes three power source systems.

The first power source 404 and second power source 406 generate power (voltage) necessary in the MFP 200 based on power supplied from an external commercial power source, and supply it to each device in the MFP 200. The auxiliary power source 401 is a power source capable of supplying power even in a state in which the first power source 404 and second power source 406 are stopped. The auxiliary power source 401 is used as a power source for driving only a power source control timer 402. Since the power consumption of the power source control timer 402 is very small, a primary battery such as a button battery is usable as the auxiliary power source 401.

The power source control timer 402 is a general RTC (Real-Time Clock) IC and has a timepiece function. The power source control timer 402 can output a timer interrupt signal and can also generate time information.

The first power source 404 is a power source for driving the NIC 101. That is, the first power source 404 functions as a power source for the NIC 101. A first power source ON/OFF switch 403 switches the first power source 404 between the ON state in which power is supplied to the NIC 101, and the OFF state in which power supply to the NIC 101 is stopped. The first power source ON/OFF switch 403 switches the first power source 404 to the ON state in accordance with an instruction signal (ON signal) output from the power source control timer 402, and switches the first power source 404 to the OFF state in accordance with an instruction signal (OFF signal) output from the NIC 101.

The second power source 406 is a power source which activates and drives the MFP main body 100 serving as the main control unit of the MFP 200. The second power source 406 functions as the main power source of the MFP 200. A second power source ON/OFF switch 405 switches the second power source 406 between the ON state in which power is supplied to the MFP main body 100, and the OFF state in which power supply to the MFP main body 100 is stopped.

The second power source ON/OFF switch 405 switches the second power source 406 to the ON state in accordance with an instruction signal (ON signal) output from the second power source control unit 304 serving as software running on the NIC 101. The second power source control unit 304 outputs, to the second power source ON/OFF switch 405, an instruction signal (from the NIC 101) based on an instruction from the server 105 that is included in a response packet received from the server 105 as a response to the above-mentioned inquiry packet. Then, the second power source 406 is turned on to start power supply to the MFP main body 100 and activate the MFP main body 100. In this manner, the NIC 101 activates the second power source 406 in accordance with an instruction (response packet) which is received as a response to the above-mentioned inquiry packet and indicates activation of the main power source. The second power source ON/OFF switch 405 switches the second power source 406 to the OFF state in accordance with an instruction signal (OFF signal) output from the MFP main body 100.

Figure 4:
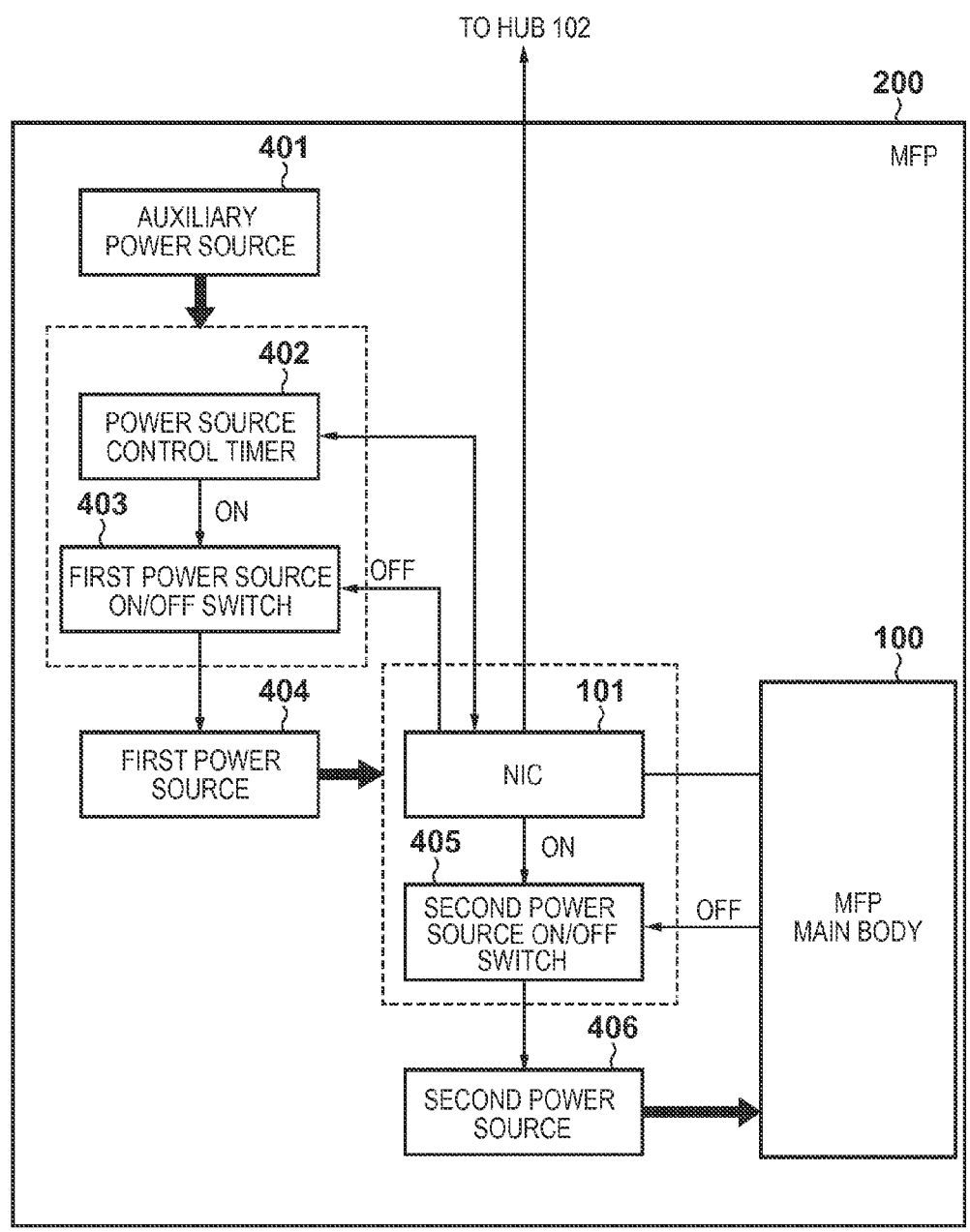
FIG. 4 is a block diagram showing an arrangement associated with power source control of the MFP 200 and the flow of an instruction signal associated with power source control according to the first and second embodiments.

With the arrangement shown in FIG. 4, the MFP 200 implements three operation states: a state in which only the power source control timer 402 operates by using the auxiliary power source 401, a state in which the NIC 101 operates by additionally using the first power source 404, and a state in which the MFP main body 100 operates by additionally using the second power source 406. The state in which the power source control timer 402 and NIC 101 operate, and the MFP main body 100 also operates by using the second power source 406 is equivalent to a state in which the whole MFP 200 operates. Note that the first power source ON/OFF switch 403 and second power source ON/OFF switch 405 operate upon receiving power supply respectively from the auxiliary power source 401 and first power source 404.

<Power Source Control in MFP 200>

Figure 5:
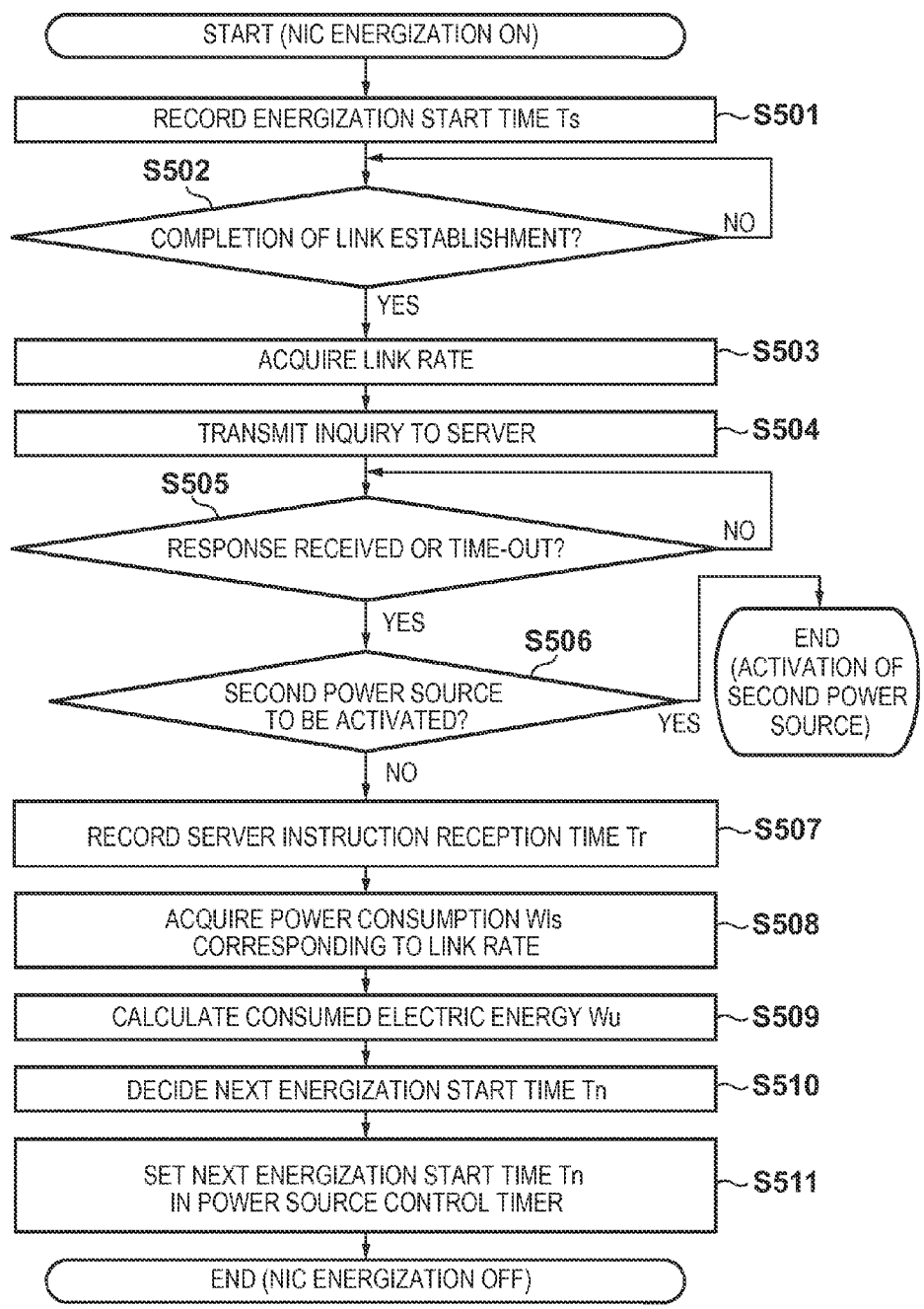
FIG. 5 is a flowchart showing power source control procedures based on an inquiry to a server 105 that are executed by the MFP 200 in a state in which a second power source 406 (main power source) is stopped according to the first embodiment.

Power source control procedures based on an inquiry to the server 105 that are executed by the MFP 200 in the state in which the second power source 406 (main power source) is stopped according to the first embodiment will be described with reference to FIG. 5.

When a timing Tn to start power supply to the NIC 101 comes in a state in which only the auxiliary power source 401 is active and the first power source 404 and second power source 406 are stopped, power supply (energization) from the first power source 404 to the NIC 101 starts. The timing decision method will be explained in detail later. The NIC 101 starts processing of inquiring, of the server 105, whether to activate the MFP main body 100 serving as the main control unit of the MFP 200 (whether to activate the second power source 406 functioning as the main power source).

As described above, the first power source ON/OFF switch 403 activates the first power source 404 in accordance with an instruction signal output from the power source control timer 402. After the first power source 404 is activated, energization from the first power source 404 to the NIC 101 starts. After the energization to the NIC 101 starts, the CPU 201 reads out a program stored in the ROM 203 into the RAM 202 and executes it, thereby activating the OS 301 on the NIC 101, as described above. Further, the network I/F driver 302, communication control unit 303, and second power source control unit 304 are activated on the CPU 201.

The second power source control unit 304 activated on the CPU 201 executes processes in step S501 and subsequent steps. First, in steps S501 to S505, the second power source control unit 304 establishes a link for communicating with the server 105, and inquires, of the server 105 via the link, whether to activate the main power source (second power source 406). Note that the second power source control unit 304 makes the inquiry to the server 105 via the communication control unit 303 and network I/F driver 302.

More specifically, in step S501, the second power source control unit 304 acquires time information from the power source control timer 402, and stores the acquired time information in the RAM 202 as information indicating the time Ts of the start of energization from the first power source 404 to the NIC 101. The second power source control unit 304 controls the communication control unit 303 to start establishment of a link with the HUB 102, thereby establishing the link for communicating with the server 105. After the start of link establishment, the second power source control unit 304 determines in step S502 whether the establishment of the link is completed, and waits till the completion of the establishment of the link. If the establishment of the link is completed ("YES" in step S502), the second power source control unit 304 acquires, from the communication control unit 303, information indicating the link rate of the link, and stores it in the RAM 202 in step S503. The power consumption of the NIC 101 changes depending on the link rate. The link rate is used later in order to calculate the consumed electric energy of the NIC 101 for an inquiry to the server 105. Note that the link rate is set by a negotiation (link negotiation) performed when the NIC 101 and HUB 102 establish a link.

In step S504, the second power source control unit 304 generates a packet for inquiring, of the server 105, whether to activate the MFP main body 100, and controls the network I/F driver 302 to execute transmission processing for the packet. The network I/F driver 302 controls the network I/F 204 to transmit the packet received from the second power source control unit 304. The transmission packet is transferred to the server 105 via the HUB 102.

After the packet transmission, in step S505, the second power source control unit 304 determines whether a response packet from the server 105 with respect to the inquiry has been received or a predetermined time (maximum response waiting time) has elapsed (time-out has occurred) without receiving a response from the server 105. If the response packet has been received or a time-out has occurred, the second power source control unit 304 advances the process to step S506.

In step S506, if the response packet has been received, the second power source control unit 304 determines whether to activate the second power source 406 based on an instruction included in the packet from the server 105. If the second power source control unit 304 has received an instruction to activate the second power source 406 (main power source) (activate the MFP main body 100), it activates the second power source 406 (turns it on) in accordance with the instruction, and ends the process. Accordingly, power supply from the second power source 406 to the MFP main body 100 starts, and the MFP main body 100 is activated from the stopped state. If the response packet from the server 105 does not include such an instruction, or a time-out has occurred, the second power source control unit 304 advances the process to step S507 without activating the second power source 406.

In step S507, the second power source control unit 304 acquires time information from the power source control timer 402, and stores the acquired time information in the RAM 202 as information indicating server instruction reception time Tr equivalent to the time when the response packet has been received from the server 105.

Then, in steps S508 and S509, the second power source control unit 304 calculates an electric energy consumed for an inquiry by the NIC 101 based on the link rate of the established link and the time taken for an inquiry to the server 105.

More specifically, in step S508, the second power source control unit 304 acquires a power consumption Wls of the NIC 101 that corresponds to the link rate stored in the RAM 202 in step S503. The power consumption Wls is equivalent to a power consumption of the NIC 101 when the NIC 101 communicates at the link rate of the established link, and can be acquired from a power consumption table 600 shown in FIG. 6 in the embodiment.

Figure 6:
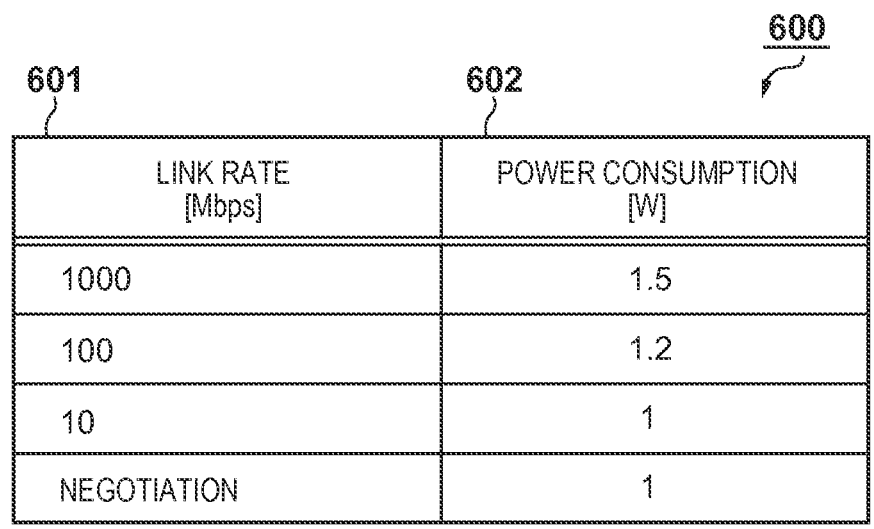
FIG. 6 is a table exemplifying a power consumption table which defines the correspondence between a plurality of link rates and power consumptions of the NIC 101 when the NIC 101 operates at the respective link rates according to the first embodiment.

FIG. 6 shows the power consumption table 600 which defines the correspondence between a plurality of link rates and power consumptions of the NIC 101 when the NIC 101 operates at the respective link rates. In the power consumption table 600, a link rate 601 defines 1,000 Mbps, 100 Mbps, and 10 Mbps. Further, the link rate 601 defines "negotiation" indicating a negotiation between the NIC 101 and the HUB 102.

A power consumption 602 defines, by watt (W), power consumptions when the NIC 101 operates at the respective link rates. A power consumption corresponding to the "negotiation" is equivalent to a power consumption while the NIC 101 performs a negotiation. The power consumptions defined in the power consumption table 600 are values obtained by measuring in advance power consumptions when the NIC 101 operates at the respective link rates. The power consumption table 600 is stored in advance in the ROM 203. By looking up the power consumption table 600 stored in the ROM 203, the second power source control unit 304 can acquire, from the table, a power consumption corresponding to the current link rate as the power consumption Wls.

Referring back to FIG. 5, in step S509, the second power source control unit 304 calculates a consumed electric energy Wu for an inquiry to the server 105 based on the power consumption Wls, energization start time Ts, and server instruction reception time Tr. The consumed electric energy Wu is an accumulated consumed electric energy by the NIC 101 during the time (Tr−Ts) taken for an inquiry to the server 105. The time taken for an inquiry to the server 105 is the time till the completion of the inquiry after establishment of a link for communicating with the server 105 starts. This time is equivalent to the time during which the first power source 404 energizes the NIC 101 for an inquiry.

The consumed electric energy Wu can be calculated as follows. In the embodiment, power supply (energization) from the first power source 404 to the NIC 101 is actually stopped after step S511. During the power supply, the NIC 101 keeps consuming power. However, the processing time of steps S507 to S511 is very short, so the power consumption of the NIC 101 during this time is not considered in calculation of the consumed electric energy Wu in the embodiment. As a matter of course, the power consumption of the NIC 101 during this processing time may be considered in calculation of the consumed electric energy Wu.

The consumed electric energy Wu can be calculated by multiplying the power consumption Wls corresponding to the link rate, and the time (Tr−Ts) during which the NIC 101 has been energized:

$$Wu = (Tr - Ts) \times Wls$$

Then, in steps S510 and S511, the second power source control unit 304 executes processing of adjusting the cycle of an inquiry to the server 105 so that the average power consumption of the MFP 200 in the state in which the second power source 406 is stopped, that is determined by the calculated consumed electric energy Wu, does not exceed a threshold corresponding to a target power. The first power source 404 enables (starts) energization to the NIC 101 in the adjusted cycle, and disables (stops) it in response to the completion of adjustment of the cycle. In the embodiment, the cycle of an inquiry to the server 105 is adjusted by determining the timing Tn to enable power supply from the first power source 404 to the NIC 101 after disabling energization from the first power source 404 to the NIC 101.

In step S510, the second power source control unit 304 decides the time Tn to start the next energization from the first power source 404 to the NIC 101 so that the average power consumption of the MFP 200 in the state in which the second power source 406 is stopped does not exceed a threshold Wlm. The threshold Wlm is a threshold corresponding to the target value (target power) of the average power consumption of the MFP 200 in the state in which the second power source 406 is stopped, and can be acquired from a threshold table 700 shown in FIG. 7.

Figure 7:
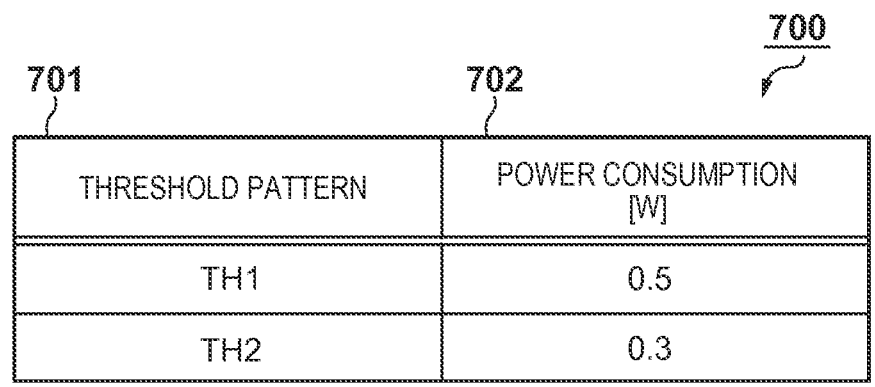
FIG. 7 is a table exemplifying a threshold table which defines the threshold of the average power consumption of the MFP 200 in the state in which the second power source 406 (main power source) is stopped according to the first embodiment.

FIG. 7 shows the threshold table 700 which defines the threshold of the average power consumption of the MFP 200 in the state in which the second power source 406 (main power source) is stopped. The threshold table 700 defines a threshold pattern formed from a plurality of thresholds. In the embodiment, two thresholds, that is, threshold 1 (TH1) and threshold 2 (TH2) are defined for a threshold pattern 701. As power consumptions 702 corresponding to TH1 and TH2, 0.5 [W] and 0.3 [W] are defined.

In the embodiment, threshold 1 (TH1) is set as a threshold used when the server 105 has responded to an inquiry. Threshold 2 (TH2) is set as a threshold used when the server 105 has not responded to an inquiry. A smaller value is set for TH2 than for TH1. By using TH2, the average power consumption of the MFP 200 is decreased, compared to the use of TH1. Decreasing the average power consumption is equivalent to prolonging the cycle of an inquiry to the server 105. The second power source control unit 304 uses TH2 at which the average power consumption decreases, in order to avoid waste of power when an inquiry is made to the server 105 at a short interval in a case in which the server 105 has not responded. Similar to the power consumption table 600, the threshold table 700 is also stored in advance in the ROM 203. The second power source control unit 304 can acquire the threshold Wlm from the table by looking up the threshold table 700 stored in the ROM 203.

The energization start time Tn can be obtained as follows by using the threshold table 700 shown in FIG. 7. Wo is the consumed electric energy of the MFP 200 while the first power source 404 is stopped (OFF) (that is, energization to the NIC 101 is OFF). The control cycle of the first power source 404 is defined by a period during which the first power source 404 is stopped (period during which energization to the NIC 101 is OFF), and a period during which the first power source 404 is activated (period during which energization to the NIC 101 is ON). The control cycle is represented as (Tn−Ts). That is, the period till the next energization start time Tn from the time Ts of the start of energization from the first power source 404 to the NIC 101 is equal to the control cycle of the first power source 404, and is equivalent to the cycle during which an inquiry is made to the server 105. The consumed electric energy of the MFP 200 in one control cycle is given by (Wu+Wo). To prevent, from exceeding the threshold Wlm, the average power consumption of the MFP 200 in the state in which the second power source 406 is stopped, it suffices to satisfy the following equation:

$$Wlm \geq (Wu+Wo)/(Tn-Ts)$$

The consumed electric energy Wo in the period in which the first power source 404 is OFF is substantially 0. This is because the second power source 406 is OFF in this period and the auxiliary power source 401 is driven by a battery. Hence, approximating the consumed electric energy Wo as 0 yields $$Wlm \geq Wu/(Tn-Ts)$$

Therefore, Tn which satisfies $$(Tn-Ts) \geq Wu/Wlm$$

can be decided as the next energization start time.

To minimize an error of the timing to turn on (activate) the main power source in the MFP 200 with respect to the power-on timing managed in the server 105, an inquiry to the server 105 needs to be made in a short cycle. To minimize the cycle, the second power source control unit 304 may decide the energization start time Tn so as to maximize the average power consumption of the MFP 200 in the state in which the second power source 406 is stopped, unless the average power consumption exceeds the threshold Wlm. That is, the energization start time Tn may be decided to satisfy $$(Tn-Ts) = Wu/Wlm$$

Finally, in step S511, the second power source control unit 304 sets the next energization start time Tn calculated in step S510 in the power source control timer 402. Further, the second power source control unit 304 outputs, to the first power source ON/OFF switch 403, an instruction signal (OFF signal) indicating that the first power source 404 should be turned off (stopped). In response to this, the first power source 404 is turned off to stop power supply (energization) from the first power source 404 to the NIC 101.

<Example of Transition of Power Consumption of MFP 200>

An example of transition of the power consumption of the MFP 200 when the MFP 200 performs power source control based on an inquiry to the server 105 by the procedures shown in FIG. 5 according to the first embodiment will be explained with reference to FIG. 8.

Figure 8:
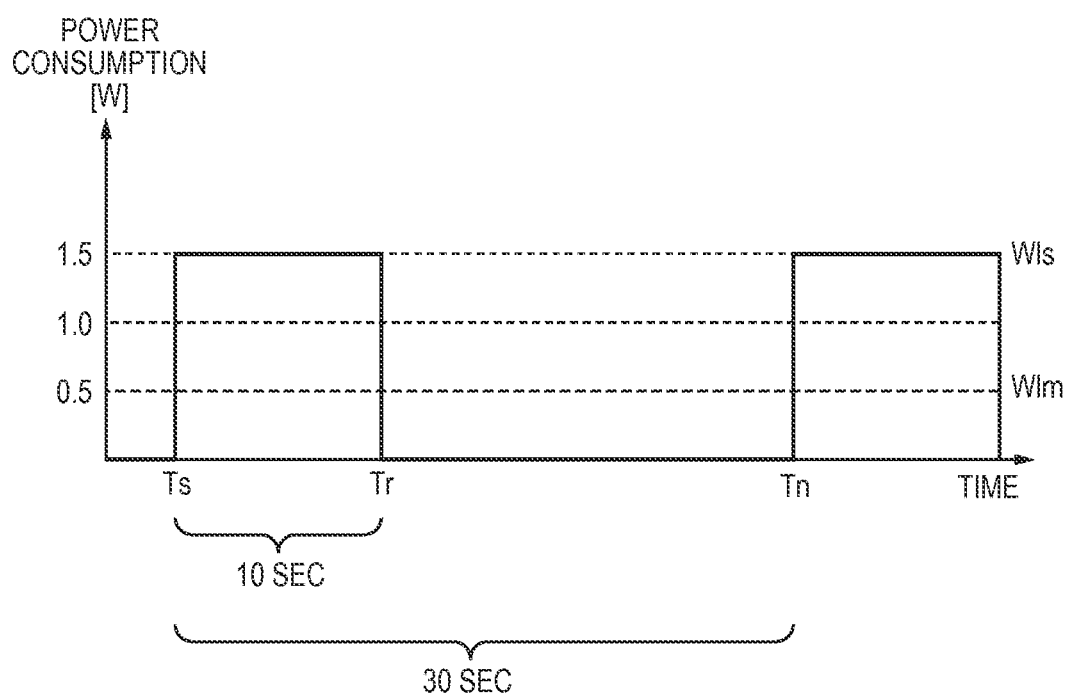
FIG. 8 is a graph exemplifying transition of the power consumption of the MFP 200 according to the first embodiment.

In FIG. 8, the power consumption of the MFP 200 changes from 0 to Wls=1.5 [W] at the energization start time Ts equivalent to the timing when the first power source 404 is turned on in the state in which the second power source 406 is stopped. Assuming that the link rate of a link established between the NIC 101 and the HUB 102 is 1,000 Mbps, the power consumption Wls of the NIC 101 is 1.5 [W] in the power consumption table 600 and is equal to the power consumption of the whole MFP 200.

In FIG. 8, the first power source 404 is turned off, and the power consumption changes from Wls to 0 at the server instruction reception time Tr equivalent to the timing when a response from the server 105 is received 10 sec after the energization start time Ts. The consumed electric energy of the MFP 200 in the period from the time Ts to the time Tr is equal to the consumed electric energy of the NIC 101 and is given by $$Wu = (Tr-Ts) \times Wls = 10\,[\sec] \times 1.5\,[W] = 15\,[W \cdot s]$$

In FIG. 8, 0.5 [W], which is threshold 1 (TH1) used when the server responded in the threshold table 700, is used as the threshold Wlm of the average power consumption. Hence, the next energization start time Tn is decided to be a time 30 sec after the time Ts:

$$(Tn-Ts) = Wu/Wlm = 15\,[W \cdot s]/0.5\,[W] = 30\,[\sec]$$

The second power source control unit 304 sets the decided time Tn in the power source control timer 402, and switches the first power source 404 to the OFF state.

After the first power source 404 is turned off at the time Tr, the power consumption of the MFP 200 becomes 0. At the time Tn 30 sec after the time Ts, the first power source 404 switches from the OFF state to the ON state based on the power source control timer 402, and the power consumption rises again to 1.5 [W].

As described above, according to the first embodiment, the MFP 200 cyclically inquires whether to activate the main power source, of the server 105 which remote-controls the timing to activate the main power source during the stop of the second power source 406 functioning as the main power source. The NIC 101 of the MFP 200, which operates by using the first power source 404 as the power source, establishes a link with an opposing apparatus for an inquiry to the server 105, and calculates an electric energy consumed for the inquiry based on the link rate of the established link and the time taken for the inquiry. Further, the NIC 101 adjusts the inquiry cycle so that the average power consumption of the MFP 200 in the state in which the second power source 406 is stopped, that is determined by the calculated consumed electric energy, does not exceed a threshold corresponding to a target power.

According to the first embodiment, the cycle of the inquiry to the server 105 (next energization timing of the NIC 101) is decided so that the average power consumption of the MFP 200 does not exceed the threshold Wlm. As a result, the power consumption in a state in which the main power source of the MFP 200 is stopped can be controlled to be equal to or smaller than the target power. Also, remote control of the timing to activate the second power source 406 by the server 105 can be implemented at higher accuracy by minimizing the inquiry cycle unless the average power consumption exceeds the threshold Wlm. Further, the MFP 200 calculates an electric energy consumed for the inquiry based on the link rate of an established link, and thus can control the power consumption to be equal to or smaller than the target value in accordance with the network connection state. That is, the power consumption can be controlled to be equal to or smaller than the target value in accordance with the network connection state while reducing an error between the power-on timing managed in the server 105 and the timing to turn on the power source of the whole apparatus in the whole MFP 200.

Second Embodiment

The first embodiment uses a power consumption corresponding to the link rate of an established link as the power consumption of the NIC 101 in a period until a response is received from the server 105 after the first power source 404 is turned on (till the completion of an inquiry to the server 105 after the start of link establishment). The power consumption is considered to be constant in this period, and the consumed electric energy Wu of the NIC 101 is calculated. In practice, however, the power consumption of the NIC 101 before a link is established may be different from a power consumption after the link is established.

In the second embodiment, a power consumption before establishment of a link between a HUB 102 (opposing apparatus) and a NIC 101 is considered more accurately, and consumed electric energies are calculated individually for a period until the link is established and a period after it is established. This can increase the calculation accuracy of the consumed electric energy of the NIC 101, and more accurately implement remote control of the timing to activate a second power source 406 by a server 105. To simplify the description, a description of the same parts as those in the first embodiment will not be repeated, and only a difference will be described.

Figure 9:
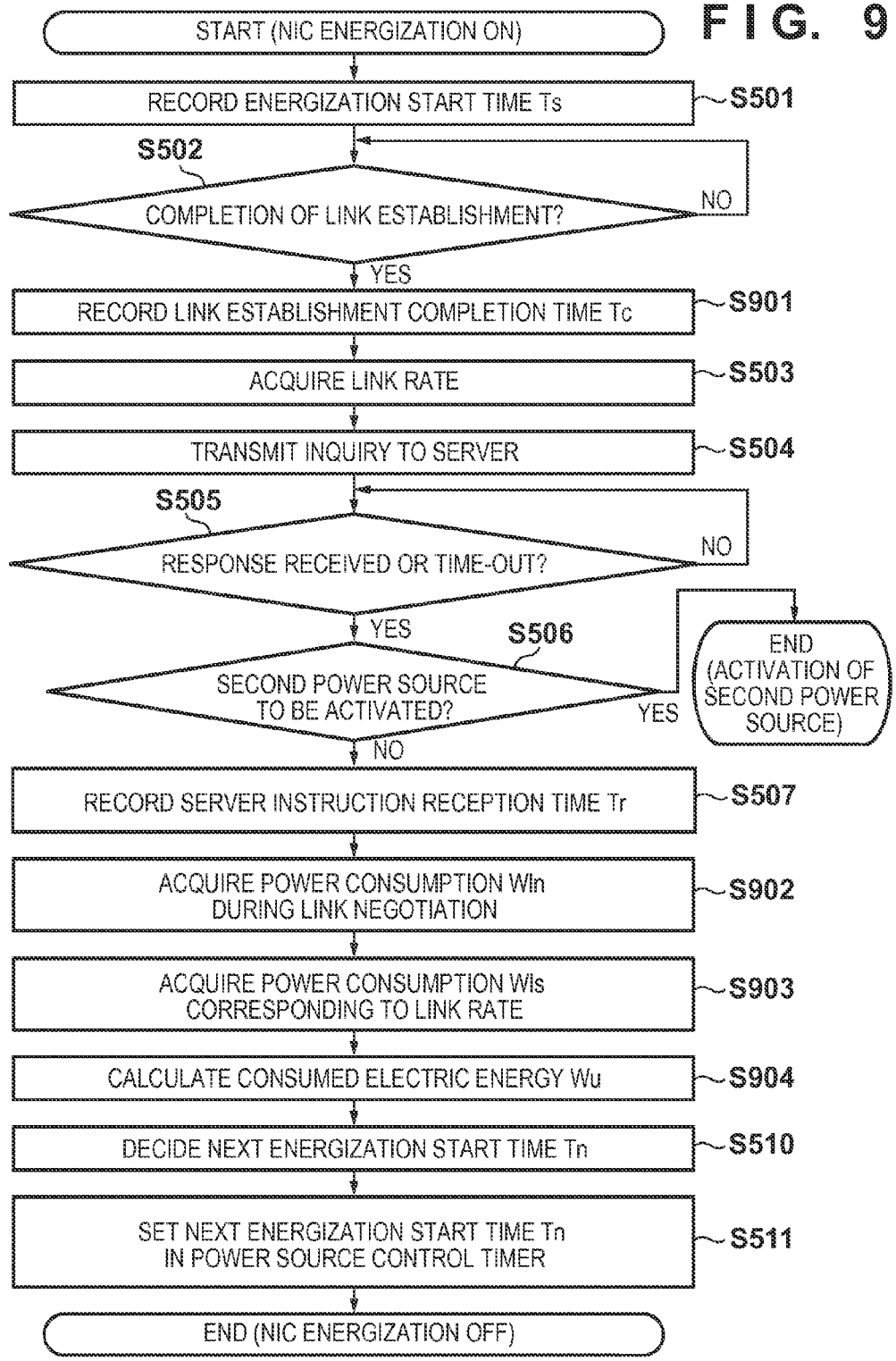
FIG. 9 is a flowchart showing power source control procedures based on an inquiry to a server 105 that are executed by the MFP 200 in the state in which a second power source 406 (main power source) is stopped according to the second embodiment.

Power source control procedures based on an inquiry to the server 105 that are executed by an MFP 200 in the state in which the second power source 406 (main power source) is stopped according to the second embodiment will be described with reference to FIG. 9. In FIG. 9, the same reference numerals as those in the first embodiment (FIG. 5) denote steps of executing the same processes, and a description thereof will not be repeated.

Steps S501 and S502 are the same as those in the first embodiment. Upon completion of establishing a link between the NIC 101 and the HUB 102 in step S502, a second power source control unit 304 advances the process to step S901. In step S901, the second power source control unit 304 acquires time information from a power source control timer 402, and stores the acquired time information in a RAM 202 as information indicating a link establishment completion time Tc. The second power source control unit 304 then advances the process to step S503.

Steps S503 to S507 are the same as those in the first embodiment. After step S507, the second power source control unit 304 advances the process to step S902. In step S902, the second power source control unit 304 acquires, from a power consumption table 600 shown in FIG. 6, the power consumption Wln of the NIC 101 in a period until establishment of the link between the NIC 101 and the HUB 102 is completed after energization from a first power source 404 to the NIC 101 is enabled. The second power source control unit 304 acquires, as the power consumption Wln, a power consumption which corresponds to "negotiation" described in the power consumption table as a power consumption during the negotiation.

In step S903, similar to the first embodiment, the second power source control unit 304 acquires, from the power consumption table 600, the power consumption Wls of the NIC 101 that corresponds to a link rate stored in the RAM 202 in step S503. The power consumption Wls is equivalent to a power consumption of the NIC 101 in a period till the completion of an inquiry (until a response from the server 105 is received) after the link for communicating with the server 105 is established.

In step S904, the second power source control unit 304 calculates the consumed electric energy Wu for an inquiry to the server 105. The second power source control unit 304 calculates the consumed electric energy Wu based on the power consumption Wln of the NIC 101 during link establishment, power consumption Wls corresponding to a link rate after link establishment, energization start time Ts, and server instruction reception time Tr. The consumed electric energy Wu is calculated as follows.

As for the consumed electric energy Wu, a consumed electric energy (first consumed electric energy) in a period (Tc−Ts) until a link is established after the start of link establishment is calculated first. Then, a consumed electric energy (second consumed electric energy) in a period until an inquiry is completed after the link is established is calculated. The sum of the two consumed electric energies calculated individually is calculated to obtain the consumed electric energy Wu. That is, $$Wu = (Tc-Ts) \times Wln + (Tr-Tc) \times Wls$$

is calculated. Consumed electric energies are individually calculated for the period until the link is established and the period after it is established. This can increase the accuracy of the consumed electric energy Wu.

After step S904, the second power source control unit 304 executes steps S510 and S511, similar to the first embodiment. The next energization start time Tn decided based on the consumed electric energy Wu calculated in step S904 is set in the power source control timer 402.

<Example of Transition of Power Consumption of MFP 200>

An example of transition of the power consumption of the MFP 200 when the MFP 200 performs power source control based on an inquiry to the server 105 by the procedures shown in FIG. 9 according to the second embodiment will be explained with reference to FIG. 10.

Figure 10:
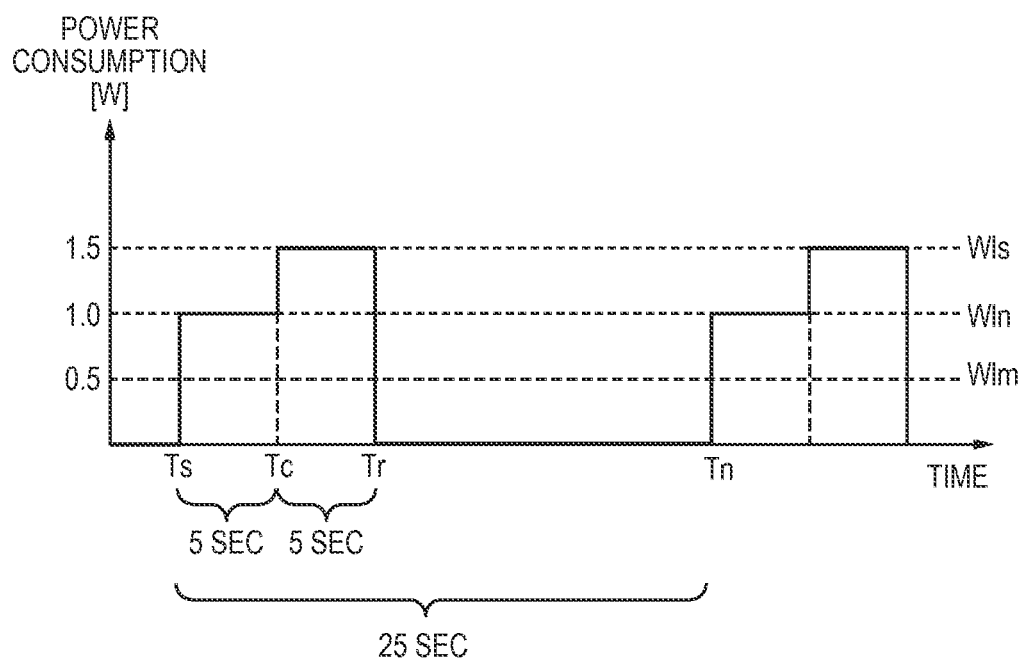
FIG. 10 is a graph exemplifying transition of the power consumption of the MFP 200 according to the second embodiment.

A comparison between FIG. 8 in the first embodiment and FIG. 10 reveals that the power consumption is not Wls but Wln during a period from the energization start time Ts to the timing (time Tc) when a link is established 5 sec after the time Ts. In the second embodiment, the power consumption of the NIC 101 during execution of a negotiation by the NIC 101 can thus be considered more accurately. The power consumption during the period from the time Ts to the time Tc is 1 [W] in the power consumption table 600.

At the time Tr 5 sec after the time Tc, a response from the server 105 is received. Assuming that the link rate of an established link is 1,000 Mbps, the power consumption of the NIC 101 in the period from the time Tc to the time Tr is 1.5 [W] in the power consumption table 600, similar to the first embodiment.

In FIG. 10, the consumed electric energy of the MFP 200 in the period from the time Is to the time Tr is equal to the consumed electric energy of the NIC 101 and is given by $$Wu = (Tc - Ts) \times Wln + (Tr - Tc) \times Wls$$
$$= 5 \ [\text{sec}] \times 1 \ [\text{W}] + 5 \ [\text{sec}] \times 1.5 \ [\text{W}]$$
$$= 12.5 \ [\text{W} \cdot \text{s}]$$

Further, similar to the first embodiment, 0.5 [W], which is threshold 1 (TH1) used when the server responds, in the threshold table 700 is used as the threshold Wlm of the average power consumption. Hence, the next energization start time Tn is calculated in accordance with $$(Tn-Ts) = Wu/Wlm = 12.5 \ [\text{W} \cdot \text{s}]/0.5 \ [\text{W}] = 25 \ [\text{sec}]$$

That is, the time Tn is decided to be 25 sec after the time Ts. The second power source control unit 304 sets the decided time Tn in the power source control timer 402, and switches the first power source 404 to the OFF state.

After the first power source 404 is turned off at the time Tr, the power consumption of the MFP 200 becomes 0. At the time Tn 25 sec after the time Ts, the power source control timer 402 switches the first power source 404 from the OFF state to the ON state, and the power consumption rises again to 1 [W].

As described above, according to the second embodiment, compared to the first embodiment, the calculation accuracy of the consumed electric energy of the NIC 101 is increased, and remote control of the timing to activate the second power source 406 by the server 105 is implemented at higher accuracy.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-176371, filed Aug. 8, 2012, which is hereby incorporated by reference herein in its entirety.

What is claimed is:

1. An information processing apparatus comprising:
a communication unit configured to communicate with a server apparatus at one network communication rate out of a plurality of network communication rates;
a first power source configured to supply power to the communication unit; and
a second power source configured to be activated by the communication unit in accordance with an instruction from the server apparatus,
the communication unit including:
an inquiry unit configured to, when a set timing comes in a state in which power supply by the second power source is stopped, communicate with the server apparatus at one network communication rate out of the plurality of network communication rates, and inquire, of the server apparatus, whether to activate the second power source; and
a setting unit configured to set, based on the one network communication rate, a timing to communicate with the server apparatus next.

2. The apparatus according to claim 1, wherein
the communication unit further includes a calculation unit configured to calculate an electric energy consumed for the inquiry by the inquiry unit, based on a network communication rate of a link established by the communication unit and a time taken for the inquiry by the inquiry unit, and
the setting unit sets the timing to communicate with the server apparatus next, by adjusting a cycle to make the inquiry, so as to prevent, from exceeding a threshold corresponding to a target power, an average power consumption of the information processing apparatus in a state in which the second power source is stopped, the average power consumption being obtained by the consumed electric energy calculated by the calculation unit.

3. The apparatus according to claim 2, wherein the first power source starts power supply to the communication unit in the cycle adjusted by the setting unit, and stops the power supply to the communication unit in response to completion of the adjustment of the cycle by the setting unit.

4. The apparatus according to claim 3, wherein
the setting unit adjusts the cycle by setting a timing to start power supply by the first power source next after power supply by the first power source is stopped in response to completion of the adjustment of the cycle,
the first power source starts power supply to the communication unit when the timing set by the setting unit comes in the state in which power supply to the communication unit is stopped, and
after the power supply by the first power source starts, the inquiry unit starts establishment of a link for communicating with the server apparatus.

5. The apparatus according to claim 2, wherein the calculation unit calculates the consumed electric energy by multiplying a power consumption corresponding to the network communication rate and the time taken for the inquiry by the inquiry unit.

6. The apparatus according to claim 5, wherein the time taken for the inquiry corresponds to a time till completion of the inquiry after a start of establishment of the link.

7. The apparatus according to claim 2, wherein the calculation unit individually calculates a first consumed electric energy in a period until the link is established after a start of establishment of the link, and a second consumed electric energy in a period until the inquiry is completed after the link is established, and calculates the consumed electric energy as a sum of the first consumed electric energy and the second consumed electric energy.

8. The apparatus according to claim 2, wherein the setting unit prolongs the cycle after a predetermined time elapses in a state in which the server apparatus has not responded to the inquiry by the inquiry unit.

9. The apparatus according to claim 1, wherein the communication unit can communicate with the server apparatus via an opposing apparatus connected to the information processing apparatus, and establishes a link between the communication unit and the opposing apparatus to communicate with the server apparatus.

10. The apparatus according to claim 9, wherein the network communication rate is set by a negotiation performed when the link is established between the communication unit and the opposing apparatus.

11. The apparatus according to claim 2, further comprising a power source control unit configured to be driven by an auxiliary power source capable of supplying power even in a state in which the first power source and the second power source are stopped, and activate the first power source in the cycle adjusted by the setting unit to cause the first power source to start power supply to the communication unit,
wherein upon completion of the adjustment of the cycle by the setting unit, the communication unit stops the first power source to stop the power supply to the communication unit.

12. A method of controlling an information processing apparatus, the information processing apparatus including a communication unit configured to communicate with a server apparatus at one network communication rate out of a plurality of network communication rates, a first power source configured to supply power to the communication unit, and a second power source configured to be activated by the communication unit in accordance with an instruction from the server apparatus, the control method comprising:

an inquiry step of, when a set timing comes in a state in which power supply by the second power source is stopped, communicating with the server apparatus at one network communication rate out of the plurality of network communication rates, and inquiring, of the server apparatus, whether to activate the second power source; and a setting step of setting, based on the one network communication rate, the timing to communicate with the server apparatus next.

13. A computer-readable storage medium storing a computer program for causing a computer to execute steps of a method of controlling an information processing apparatus, the information processing apparatus including a communication unit configured to communicate with a server apparatus at one network communication rate out of a plurality of network communication rates, a first power source configured to supply power to the communication unit, and a second power source configured to be activated by the communication unit in accordance with an instruction from the server apparatus, the control method comprising:

an inquiry step of, when a set timing comes in a state in which power supply by the second power source is stopped, communicating with the server apparatus at one network communication rate out of the plurality of network communication rates, and inquiring, of the server apparatus, whether to activate the second power source; and a setting step of setting, based on the one network communication rate, the timing to communicate with the server apparatus next.

* * * * *